(12) United States Patent
Xing et al.

(10) Patent No.: US 9,848,444 B2
(45) Date of Patent: Dec. 19, 2017

(54) METHOD AND SYSTEM FOR WIRELESS STATION TO ACCESS CHANNEL

(71) Applicant: ZTE Corporation, Shenzhen, Guangdong (CN)

(72) Inventors: Weimin Xing, Shenzhen (CN); Kaiying Lv, Shenzhen (CN); Bo Sun, Shenzhen (CN); Jing Jiang, Shenzhen (CN); Nan Li, Shenzhen (CN); Kaibo Tian, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 674 days.

(21) Appl. No.: 14/426,227

(22) PCT Filed: Sep. 27, 2012

(86) PCT No.: PCT/CN2012/082228
§ 371 (c)(1),
(2) Date: May 1, 2015

(87) PCT Pub. No.: WO2013/053296
PCT Pub. Date: Apr. 18, 2013

(65) Prior Publication Data
US 2015/0312940 A1    Oct. 29, 2015

(30) Foreign Application Priority Data
Oct. 9, 2011  (CN) .......................... 2011 1 0301762

(51) Int. Cl.
*H04W 74/08* (2009.01)
*H04W 84/12* (2009.01)

(52) U.S. Cl.
CPC ........ *H04W 74/0816* (2013.01); *H04W 84/12* (2013.01)

(58) Field of Classification Search
CPC . H04W 74/0816; H04W 84/12; H04W 72/04; H04W 72/12; H04W 76/00;
(Continued)

(56) References Cited

U.S. PATENT DOCUMENTS 7,519,030 B2    4/2009  Cimini, Jr.
7,894,413 B1    2/2011  Cimini, Jr.
(Continued)

FOREIGN PATENT DOCUMENTS

| CN | 101582818 A | 11/2009 |
| CN | 101796878 A | 8/2010 |
| EP | 1315335 A1 | 5/2003 |

OTHER PUBLICATIONS

International Search Report in international application No. PCT/CN2012/082228, dated Jan. 3, 2013.
(Continued)

*Primary Examiner* — Robert Lopata
(74) *Attorney, Agent, or Firm* — Oppedahl Patent Law Firm LLC

(57) ABSTRACT

Provided are a method and system for a wireless STA to access a channel. The method includes that the wireless STA acquires a transmission ending moment of a wireless frame when selecting to refuse or drop the wireless frame and not updating a locally stored Network Allocation Vector (NAV); and the wireless STA accesses the channel when the transmission of the wireless frame is ended and a preset condition is met. According to the disclosure, a collision problem may happen to the wireless STA, and the wireless STA can access the channel only when the preset condition is determined to be met after the transmission of the wireless frame is ended, so that the problem of transmission collision with a hidden STA during the wireless frame transmission of the wireless STA is solved.

10 Claims, 2 Drawing Sheets

(58) Field of Classification Search
CPC ............... H04B 7/2121; H04B 7/2123; H04J 2203/0069; H04Q 2213/394
USPC .......................................................... 370/329
See application file for complete search history.

(56) References Cited

U.S. PATENT DOCUMENTS

| | | | |
|---|---|---|---|
| 8,121,103 B2 | 2/2012 | Cimini, Jr. | |
| 8,144,676 B2 | 3/2012 | Wentink | |
| 9,332,564 B2* | 5/2016 | Stephens | H04W 74/06 |
| 2003/0152058 A1 | 8/2003 | Cimini, Jr. | |
| 2005/0141545 A1* | 6/2005 | Fein | H04B 7/0617 370/445 |
| 2006/0227802 A1* | 10/2006 | Du | H04W 74/0816 370/447 |
| 2007/0058605 A1* | 3/2007 | Meylan | H04W 72/0406 370/346 |
| 2007/0115882 A1* | 5/2007 | Wentink | H04N 21/4126 370/329 |
| 2007/0177534 A1* | 8/2007 | Chen | H04W 52/0225 370/311 |
| 2009/0059824 A1 | 3/2009 | Wentink | |
| 2009/0279524 A1* | 11/2009 | Yu | H04W 74/0833 370/338 |
| 2010/0135268 A1* | 6/2010 | Seok | H04W 74/0816 370/338 |
| 2010/0315980 A1* | 12/2010 | Chu | H04W 74/0816 370/310 |
| 2011/0038358 A1* | 2/2011 | Wang | H04W 74/0816 370/338 |
| 2011/0134816 A1* | 6/2011 | Liu | H04L 1/06 370/310 |
| 2011/0149770 A1 | 6/2011 | Cimini, Jr. | |
| 2011/0310869 A1* | 12/2011 | Xhafa | H04L 1/1854 370/338 |
| 2012/0039257 A1* | 2/2012 | Morioka | H04W 28/06 370/328 |
| 2012/0099530 A1* | 4/2012 | Morioka | H04W 72/046 370/328 |
| 2012/0106352 A1* | 5/2012 | Peruzzi | H04W 74/08 370/241 |
| 2012/0195302 A1* | 8/2012 | Park | H04B 7/0452 370/338 |
| 2012/0213308 A1* | 8/2012 | Merlin | H04L 1/1621 375/295 |
| 2014/0185557 A1* | 7/2014 | Yang | H04W 74/0816 370/329 |

OTHER PUBLICATIONS

English Translation of the Written Opinion of the International Search Authority in international application No. PCT/CN2012/082228, dated Jan. 3, 2013.

* cited by examiner

METHOD AND SYSTEM FOR WIRELESS STATION TO ACCESS CHANNEL

TECHNICAL FIELD

The disclosure relates to the field of wireless communication, in particular to a method and system for a wireless station (STA) to access a channel.

BACKGROUND

At present, along with the rapid development of a Wireless Local Area Network (WLAN) in the field of wireless networks, a demand for the coverage of the WLAN is growing, and a requirement on throughput is also increasing. In industrial standard group Institute of Electrical and Electronic Engineers 802.11 (IEEE802.11), a series of most common WLAN technical standards such as 802.11a, 802.11b and 802.11g are defined at first, and then other task groups dedicated to develop specifications related to technological improvements on conventional 802.11 appear one after another. For example, a 802.11n task group expresses a requirement on High Throughput (HT), introduces Multiple-Input Multiple-Out-put (MIMO) and beam-forming technologies, and supports a data rate as high as 600 Mbps; a 802.11ac task group further presents the concept of Very High Throughput (VHT), and introduces a higher-channel bandwidth technology, a higher-order MIMO technology, a Multiple-User MIMO (MU-MIMO) technology and the like to achieve a data rate capable of reaching more than 1 Gbps; and certainly, a new protocol is required to be backwards-compatible with a previous protocol.

In the WLAN, an Access Point (AP) and a plurality of STAB associated with the AP form a Basic Service Set (BSS). When a channel is shared by a plurality of STAB, it is difficult to detect a conflict in a wireless environment, and one major problem is a hidden STA. The hidden STA is specifically shown in FIG. 1, and FIG. 1 shows three BSSs, i.e. BSS1, BSS2 and BSS3, wherein STA A transmits data to STA B, STA C also transmits data to STA B at the same time, and the simultaneous data transmission of STA A and STA C may cause a conflict because STA C and STA A are located outside the coverage of each other. Therefore, from the point of STA A, STA C is a hidden STA. In order to solve the problem of hidden STA, 802.11 put forwards a virtual channel detection mechanism, that is, channel reservation time information is included in a frame header of a wireless frame, another guest STA receiving the wireless frame including the channel reservation time information sets a locally stored Network Allocation Vector (NAV) of which a value is set to be a maximum value of the channel reservation time information, and within the time, the guest STA will not transmit data, thereby avoiding a collision caused by the competition of a hidden node for a channel. The guest STA can transmit data only after the NAV is reduced to be zero. For example, a transmitter transmits a Request To Send (RTS) frame including the channel reservation time information for channel reservation, and a receiver responds with a Clear To Send (CTS) frame also including the channel reservation time information for channel reservation confirmation to ensure that the transmitter can finish frame switching. The setting of the NAV in the RTS/CTS frame is shown in FIG. 2.

In the WLAN, in order to better reduce power, when an STA detects a Physical Protocol Data Unit (PPDU) and a header of the PPDU indicates that the STA is not a receiver of the PPDU, the STA may give up receiving the PPDU and does not update own NAV. For example, in a WLAN protocol, the STA may give up receiving a certain PPDU and does not update own NAV under two conditions as follows:

the PPDU is a Single User (SU) VHT PPDU, and a Group Identifier (ID) and a Partial Application Identifier (AID) in its header indicate that the STA may not be a target receiver, that is, the Partial AID in the PPDU is different from a Partial AID of the STA, or the Group ID in the PPDU is 0, but the STA is neither an AP nor a Mesh STA; and the PPDU is an MU VHT PPDU, the STA is not in an MU group indicated by the Group ID in the PPDU, or the STA is in the MU group indicated by the Group ID in the PPDU but a space-time stream number indicated at an MU group position where the STA is located is 0.

In a prior art, it is defined that a STA can drop a PPDU and does not update a NAV under a certain condition, but the subsequent operation of the STA is not specified, which may cause a transmission collision. For example, STA1 transmits a VHT PPDU to STA2, STA3 is a guest STA and can receive a signal of STA1 but cannot detect a signal of STA2, that is, STA2 and STA3 are mutually hidden STAB; STA3 determines that the PPDU is not intended to be transmitted to itself by detecting the header of the PPDU, selects to drop the PPDU, and does not update the NAV. After the VHT PPDU is transmitted, STA2 returns an Acknowledgement (ACK) frame to STA1 after a Short Inter-Frame Space (SIFS); STA3 may compete for a channel after the transmission of the PPDU is ended, wherein STA3 can know a transmission ending moment of the PPDU through the frame; and if STA3 competes for the channel by virtue of an Arbitration Inter-Frame Space[Access Category] (AIFS [AC]) or a Distributed Inter-Frame Space (DIFS) (which is generally shorter than the transmission time of the ACK frame), and since STA3 did not update own NAV and cannot detect the ACK frame transmitted by STA2, the signals of STA2 and STA3 are likely collided at STA1, that is, STA3 interferes in data transmission between STA1 and STA2. Similar conditions may occur in MU transmission and the like, and they will not be repeated.

SUMMARY

In view of this, a main purpose of the disclosure is to provide a method and system for a wireless STA to access a channel, so as to solve the problem of transmission collision between hidden STAB.

In order to achieve the purpose, the technical solutions of the disclosure are implemented as follows.

A method for a wireless STA to access a channel includes that:

the wireless STA acquires a transmission ending moment of a wireless frame when selecting to refuse or drop the wireless frame and not updating a local NAV stored locally; and the wireless STA accesses the channel when transmission of the wireless frame is ended and a preset condition is met.

Furthermore, the method may further include that:

the wireless STA selects to refuse or drop the wireless frame when determining that the wireless STA is not a target receiving STA of the wireless frame by detecting a physical frame header of the wireless frame.

The step that the wireless STA acquires the transmission ending moment of the wireless frame may implemented as follows:

the wireless STA acquires the transmission ending moment of the wireless frame by virtue of an L-SIG part of the physical frame header of the wireless frame.

Furthermore, before the wireless STA accesses the channel, the method may further include that the wireless STA judges whether the local NAV is 0 or not, accesses the channel when the local NAV is 0, otherwise when the local NAV is not 0, the wireless STA waits to access the channel until the local NAV becomes 0.

That the transmission of the wireless frame is ended and the preset condition is met may refer to that:

the preset condition is determined to be met after a preset waiting time is started after the transmission of the wireless frame is ended, and after the preset waiting time is up, wherein the preset waiting time is an Extended Inter-Frame Space (EIFS) or EIFS−DIFS+AIFS[AC]; and DIFS=aSIFSTime+2*aSlotTime; EIFS=aSIFSTime+DIFS+ACKTxTime; AIFS[AC]=AIFSN[AC]*aSlotTime+aSIFSTime, aSIFSTime is a time length of a Short Inter-Frame Space (SIFS), aSlotTime is a time length of a timeslot, and AIFS[AC] is an Inter-Frame Space (IFS) corresponding to each priority queue AC; AIFSN[AC] is an integer corresponding to each priority queue AC; and ACKTxTime is a transmission time of an ACK frame.

That the transmission of the wireless frame is ended and the preset condition is met may refer to that:

the wireless STA receives a frame sequence after the transmission of the wireless frame is ended, and the local NAV is correctly set in the frame sequence; or the wireless STA correctly decodes L-SIG information of the physical frame header of the wireless frame after the transmission of the wireless frame is ended; or the wireless STA waits for a preset dot11VHTProbeDelay time after the transmission of the wireless STA is ended.

A system for a wireless STA to access a channel includes the wireless STA which is configured to acquire a transmission ending moment of a wireless frame when selecting to refuse or drop the wireless frame and not updating a local NAV locally stored, and to access the channel when the transmission of the wireless frame is ended and a preset condition is met.

Furthermore, the wireless STA may be configured to select to refuse or drop the wireless frame when determining that the wireless STA is not a target receiving STA of the wireless frame by detecting a physical frame header of the wireless frame.

Wherein, the wireless STA may be configured to acquire the transmission ending moment of the wireless frame by virtue of an L-SIG part of the physical frame header of the wireless frame.

Furthermore, the wireless STA may be configured to judge whether the local NAV is 0 or not; to access the channel when the local NAV is 0; to wait to access the channel until the local NAV becomes 0, when the local NAV is not 0.

The wireless STA may be configured to determine that the preset condition is met after a preset waiting time is started after the transmission of the wireless frame is ended, and after the preset waiting time is up, wherein the preset waiting time is an Extended Inter-Frame Space (EIFS) or an Extended Inter-Frame Space−Distributed Inter-Frame Space+Arbitration Inter-Frame Space[Access Category] (EIFS−DIFS+AIFS[AC]); and DIFS=aSIFSTime+2*aSlotTime; EIFS=aSIFSTime+DIFS+ACKTxTime; AIFS[AC]=AIFSN[AC]*aSlotTime+aSIFSTime, aSIFSTime is a time length of a Short Inter-Frame Space (SIFS), aSlotTime is a time length of a timeslot, and AIFS[AC] is an Inter-Frame Space (IFS) corresponding to each priority queue AC; AIFSN[AC] is an integer corresponding to each priority queue AC; and ACKTxTime is a transmission time of an ACK frame.

The wireless STA may be configured to receive a frame sequence in which the local NAV is correctly set after the transmission of the wireless frame is ended; or correctly decode L-SIG information of the physical frame header of the wireless frame after the transmission of the wireless frame is ended; or wait for a preset dot11VHTProbeDelay time after the transmission of the wireless STA is ended.

According to the disclosure, in a situation that a collision is possible to happen to a wireless STA, the wireless STA can access a channel only when a preset condition is determined to be met after the transmission of the wireless frame is ended, thereby avoiding transmission collision with a hidden STA during the wireless frame transmission of the wireless STA.

DETAILED DESCRIPTION

Figure 1:
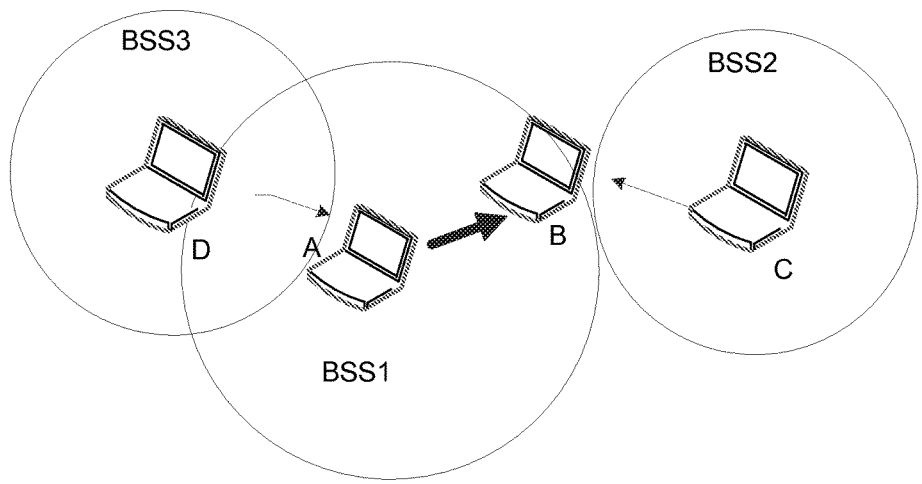
FIG. 1 is a structure diagram of a hidden STA.
Figure 2:
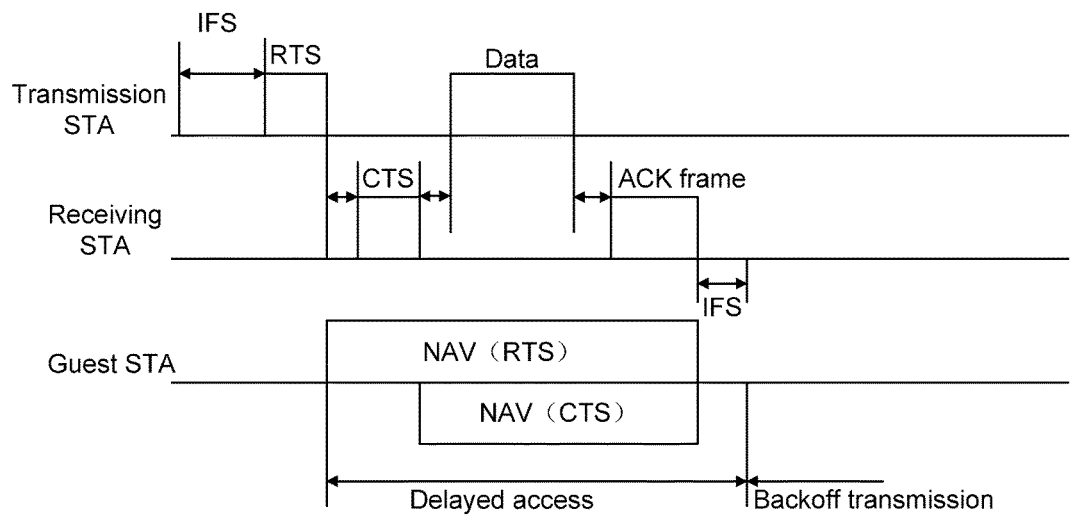
FIG. 2 is a schematic diagram of an RTS/CTS using method.

In a WLAN, 802.11 defines two operation modes which are Distributed Coordination Function (DCF) and Point Coordination Function (PCF), and defines improvements on the two operation modes which are Enhanced Distributed Channel Access (EDCA) and Hybrid Coordination Function Controlled Channel Access (HCCA). DCF is the most basic operation mode, and enables multiple STAB to share a wireless channel by virtue of a Carrier Sense Multiple Access with Collision Avoidance (CSMA/CA) mechanism. EDCA is an enhanced operation mode, and enables multiple different priority queues to share a wireless channel and to reserve Transmission Opportunities (TXOP) by virtue of a CSMA/CA mechanism, wherein the different priority queues are called Access Categories (ACs). In addition, when Media Access Control (MAC) layer Quality of Service (QoS) is not defined in an early stage of 802.11, three most common Inter-Frame Spaces (IFSs) are used for different scenarios, and specifically include a DIFS, a Point Inter-Frame Space (PIFS) and an SIFS, wherein the DIFS is used for a DCF competition access condition, the PIFS is an IFS with a medium length and a medium priority and is used for PCF operation, and the SIFS is the shortest IFS with the highest priority and is used for operation required to be acknowledged immediately. In a current QoS STA, an AIFS is used instead of the DIFS under a QoS competition access mechanism, and specifically, AIFS[AC] is priority-based access control, and AC represents different priorities of service types.

Under DCF and EDCA mechanisms, when an STA wants to acquire TXOP and detects that a channel is idle, the STA should continue detecting the channel, and can start transmission only when the channel is ensured to still be idle within a specific time xIFS+n*aSlotTime, wherein xIFS is a specific IFS, n is a random number of a set [0,CW], CW is called a competition window, and aSlotTime is a length of a timeslot.

Specifically, under the DCF mechanism, when the STA detects that the channel gets idle after receiving a frame which is mistakenly received, the xIFS is required to adopt an EIFS, and the DIFS should be used under other conditions.

Similarly, under the EDCA mechanism, when the STA detects that a channel gets idle after receiving a frame which is mistakenly received, the xIFS is required to adopt EIFS−DIFS+AIFS[AC] corresponding to each AC of the STA, and AIFS[AC] should be used under other conditions, wherein AIFS[AC] refers to an IFS corresponding to each priority queue AC under EDCA.

The EIFS actually means that the STA should wait for an SIFS plus the transmission time of an ACK frame to prevent interference with another STA before a DIFS+n*aSlotTime competition process is normally started when the STA does not correctly receive a data frame under the DCF mechanism; and EIFS−DIFS+AIFS[AC] functions the same way, but is used for a condition under the EDCA mechanism; if the DIFS is replaced by a related AIFS[AC], a time relation between the IFSs is that:

DIFS=aSIFSTime+2*aSlotTime;
AIFS[AC]=AIFSN[AC]*aSlotTime+aSIFSTime;
EIFS=aSIFSTime+DIFS+ACKTxTime;
EIFS−DIFS+AIFS[AC]=aSIFSTime+AIFS[AC]+ACKTxTime;

wherein aSIFSTime is a time length of one SIFS, aSlotTime is the time length of one timeslot, and AIFS[AC] is an IFS corresponding to each priority queue AC, and ACKTxTime is the transmission time of one ACK frame.

A basic thought of the disclosure is that: a wireless STA acquires a transmission ending moment of a wireless frame when refusing to receive or dropping the wireless frame and not updating a locally stored NAV, judges whether the local NAV is 0 or not when the transmission of the wireless frame is ended and a preset triggering condition is met, and accesses a channel when the local NAV is 0.

In order to make clearer the purpose, technical solutions and advantages of the disclosure, the disclosure is further described below with reference to embodiments and the drawings in detail.

Figure 3:
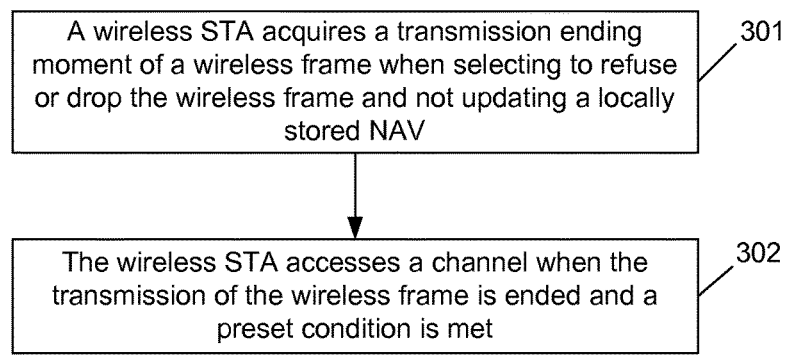
FIG. 3 is an implementation flowchart of a method for a wireless STA to access a channel according to the disclosure.

FIG. 3 is an implementation flow of a method for a wireless STA to access a channel according to the disclosure, and as shown in FIG. 3, the method includes the following steps that:

Step 301: a wireless STA acquires a transmission ending moment of a wireless frame when selecting to refuse or drop the wireless frame and not updating a locally stored NAV;

specifically, the wireless STA refuses to receive or drops the wireless frame when determining that the wireless STA is not a target receiving STA of the wireless station by detecting a physical frame header of the wireless frame;

wherein the step that the wireless STA acquires the transmission ending moment of the wireless frame is specifically implemented as follows: the wireless STA acquires the transmission ending moment of the wireless frame by virtue of an L-SIG part of the physical frame header of the wireless frame; and Step 302: the wireless STA accesses the channel when the transmission of the wireless frame is ended and a preset condition is met;

specifically, the step further includes that the wireless STA judges whether the local NAV is 0 or not; the wireless STA accesses the channel if the local NAV is 0; the wireless STA waits to access the channel until the local NAV is 0 if the local NAV is not 0.

That the transmission of the wireless frame is ended and the preset condition is met refers to that:

the preset condition is determined to be met after a preset waiting time is started after the transmission of the wireless frame is ended, and after the preset waiting time is up, wherein the preset waiting time is an EIFS or EIFS−DIFS+AIFS[AC]; and DIFS=aSIFSTime+2*aSlotTime; EIFS=aSIFSTime+DIFS+ACKTxTime; AIFS[AC]=AIFSN[AC]*aSlotTime+aSIFSTime, aSIFSTime is a time length of an SIFS, aSlotTime is a time length of a timeslot, and AIFS[AC] is an IFS corresponding to each priority queue AC, AIFSN[AC] is an integer corresponding to each priority queue AC, and ACKTxTime is the transmission time of an ACK frame.

Or, that the transmission of the wireless frame is ended and the preset condition is met refers to that:

the wireless STA receives a frame sequence after the transmission of the wireless frame is ended, and the local NAV is correctly set in the frame sequence; or the wireless STA correctly decodes L-SIG information of the physical frame header of the wireless frame after the transmission of the wireless frame is ended; or the wireless STA waits for a preset dot11VHTProbeDelay time after the transmission of the wireless STA is ended, wherein the dot11VHTPSProbeDelay is a parameter defined in a local Management Information Base (MIB) of the STA, and defines an energy-saving probe delay of a 802.11 VHT STA.

The disclosure also provides a system for a wireless STA to access a channel, which includes the wireless STA, configured to acquire a transmission ending moment of a wireless frame when selecting to refuse or drop the wireless frame and not updating a locally stored NAV, and access the channel when the transmission of the wireless frame is ended and a preset condition is met.

Furthermore, the wireless STA is also configured to select to refuse or drop the wireless frame when determining that the wireless STA is not a target receiving STA of the wireless frame by detecting a physical frame header of the wireless frame.

Furthermore, the wireless STA is specifically configured to acquire the transmission ending moment of the wireless frame by virtue of an L-SIG part of the physical frame header of the wireless frame.

Furthermore, the wireless STA is also configured to judge whether the local NAV is 0 or not; to access the channel when the local NAV is 0; to wait to access the channel until the local NAV becomes 0, when the local NAV is not 0.

Furthermore, the wireless STA is specifically configured to determine that the preset condition is met after a preset waiting time is started after the transmission of the wireless frame is ended and after the waiting time is up, wherein the waiting time is an EIFS or EIFS−DIFS+AIFS[AC]; and DIFS=aSIFSTime+2*aSlotTime; EIFS=aSIFSTime+DIFS+ACKTxTime; AIFS[AC]=AIFSN[AC]*aSlotTime+aSIFSTime, aSIFSTime is a time length of an SIFS, aSlotTime is a time length of a timeslot, and AIFS[AC] is an IFS corresponding to each priority queue AC, AIFSN[AC] is an integer corresponding to each priority queue AC, and ACKTxTime is the transmission time of an ACK frame.

Furthermore, the wireless STA is specifically configured to receive a frame sequence in which the local NAV is correctly set after the transmission of the wireless frame is ended; or to correctly decode L-SIG information of the physical frame header of the wireless frame after the transmission of the wireless frame is ended; or to wait for a preset dot11VHTProbeDelay time after the transmission of the wireless STA is ended.

The method is further described with reference to specific embodiments in detail under the following scenarios.

Application scenario is that: a transmission STA1 transmits an SU/MU VHT PPDU after acquiring a TXOP, it is supposed that STA2 acquiescently returns an ACK frame after an SIFS after receiving the SU/MU VHT PPDU, STA3 is a guest STA, and the SU/MU VHT PPDU does not include data transmitted to STA3.

STA1 may include indication information into an L-SIG part of a physical frame header when transmitting the SU/MU VHT PPDU, the transmission time of the PPDU can be obtained from the information, and Group ID and Partial AID are included in VHT-SIG-A of the physical frame header of the PPDU, and can indicate whether the PPDU is an SU PPDU or an MU PPDU, a possible target receiving STA and an space-time stream number of each user when the PPDU is the MU PPDU.

After STA3 decodes the L-SIG and VHT-SIG-A of the SU/MU VHT PPDU transmitted by STA1, one of the following conditions appears:

the PPDU is an SU VHT PPDU, and a Group ID and a Partial AID in its physical frame header indicate that STA 3 can not be a target receiver, that is, the Partial AID in the PPDU is different from a Partial AID of STA3, or the Group ID in the PPDU is 0, but STA3 is neither an AP nor a Mesh STA; and the PPDU is an MU VHT PPDU, STA3 is not in an MU group indicated by the Group ID in the PPDU, or STA3 is in the MU group indicated by the Group ID in the PPDU, but a space-time stream number indicated at an MU group position where the STA3 is located is 0.

At this moment, STA3 selects not to receive or drop the SU/MU VHT PPDU, and does not update the local NAV.

Embodiment 1

Figure 4:
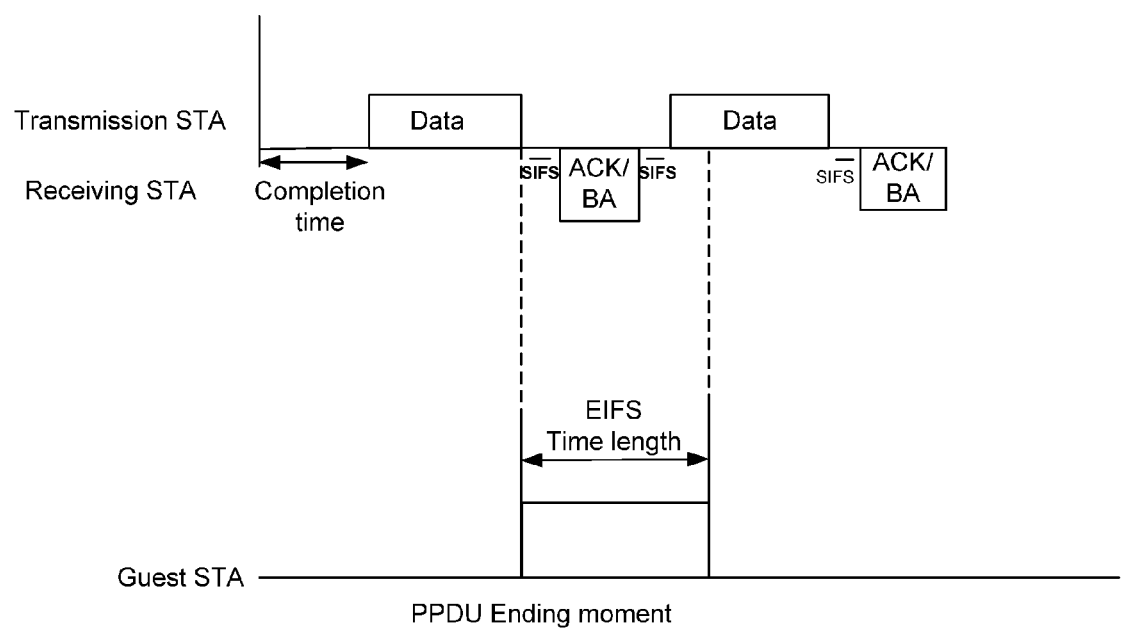
FIG. 4 is a schematic diagram of a time length relation when a waiting time is an EFIS in a method for a wireless STA to access a channel according to the disclosure.

STA3 selects to refuse or drop an SU/MU VHT PPDU which is not intended to be transmitted to STA3, and does not update a local NAV; when STA3 needs to access a channel after the transmission of the SU/MU VHT PPDU is ended, STA3 should compete to access the channel after the transmission of the SU/MU VHT PPDU is ended, wherein STA 3 may acquire an ending moment of the PPDU through L-SIG, and STA 3 uses an EIFS as a time length of waiting time when working under a DCF mechanism or uses EIFS−DIFS+AIFS[AC] as the time length of the waiting time when working under an EDCA mechanism, that is, xIFS in xIFS+n*aSlotTime should be the EIFS or EIFS−DIFS+AIFS[AC] during competition; and here, STA3 further needs to judge whether the local NAV is 0 or not, and when the NAV is not 0, that is, the NAV of STA3 is ended after the waiting time, STA3 can start a competition access process only after the NAV is ended. The time length of the EIFS or EIFS−DIFS+AIFS[AC] is more than or equal to the sum of the ACK/BA frame returning time of STA2 plus the SIFS plus the DIFS or AIFS[AC], and specifically as shown in FIG. 4, STA3 waits for an SIFS plus the transmission time (ACKTxTime) of an ACK frame before a DIFS+n*aSlotTime competition process is normally started, so that the use of the EIFS may prevent interference with an ACK process of STA2 when the wireless frame is refused or dropped and the NAV is not updated.

Embodiment 2

STA3 selects to refuse or drop an SU/MU VHT PPDU which is not intended to be transmitted to STA3, and does not update a local NAV, and when STA3 wants to access a channel after the transmission of the SU/MU VHT PPDU is ended, STA3 can further perform local NAV judgment and judge whether to start a channel access process or not only after one of the following conditions occurs after the transmission of the SU/MU VHT PPDU is ended:

STA3 receives a frame sequence in which the local NAV is correctly set after the transmission of the wireless frame is ended;

STA3 correctly decodes L-SIG information of the physical frame header of the PPDU after the transmission of the PPDU is ended; and STA3 waits for a conventional specified dot11VHTProbeDelay time length after the transmission of the wireless STA is ended.

The above are only the preferred embodiments of the disclosure and not intended to limit the scope of protection of the disclosure.

What is claimed is:

1. A method for a wireless Station (STA) to access a channel, comprising:
   acquiring, by the wireless STA, a transmission ending moment of a wireless frame when selecting to refuse or drop the wireless frame and not updating a local Network Allocation Vector (NAV) which is stored locally; and
   accessing the channel when transmission of the wireless frame is ended and a preset condition is met;
   wherein that the transmission of the wireless frame is ended and the preset condition is met refers to that:
   the preset condition is determined to be met after a preset waiting time is started after the transmission of the wireless frame is ended, and after the preset waiting time is up, wherein the preset waiting time is an Extended Inter-Frame Space (EIFS) or Extended Inter-Frame Space−Distributed Inter-Frame Space+Arbitration Inter-Frame Space[Access Category] (EIFS−DIFS+AIFS[AC]); and
   DIFS=aSIFSTime+2*aSlotTime; EIFS=aSIFSTime+DIFS+ACKTxTime; AIFS[AC]=AIFSN[AC]*aSlotTime+aSIFSTime, aSIFSTime is a time length of a Short Inter-Frame Space (SIFS), aSlotTime is a time length of a timeslot, and AIFS[AC] is an Inter-Frame Space (IFS) corresponding to each priority queue AC; AIFSN[AC] is an integer corresponding to each priority queue AC; and ACKTxTime is a transmission time of an Acknowledgement (ACK) frame.

2. The method according to claim 1, further comprising:
   selecting, by the wireless STA, to refuse or drop the wireless frame when determining that the wireless STA is not a target receiving STA of the wireless frame by detecting a physical frame header of the wireless frame.

3. The method according to claim 1, wherein acquiring the transmission ending moment of the wireless frame comprises:
   acquiring, by the wireless STA, the transmission ending moment of the wireless frame by virtue of an L-SIG part of a physical frame header of the wireless frame.

4. The method according to claim 1, before accessing the channel, the method further comprising:
   judging whether the local NAV is 0 or not;
   accessing the channel when the local NAV is 0;
   waiting to access the channel until the local NAV becomes 0, when the local NAV is not 0.

5. The method according to claim 1, wherein that the transmission of the wireless frame is ended and the preset condition is met further refers to that:

the wireless STA receives a frame sequence after the transmission of the wireless frame is ended, and the local NAV is correctly set in the frame sequence; or the wireless STA correctly decodes L-SIG information of a physical frame header of the wireless frame after the transmission of the wireless frame is ended; or the wireless STA waits for a preset dot11VHTProbeDelay time after the transmission of the wireless STA is ended.

6. A system for a wireless Station (STA) to access a channel, comprising the wireless STA which is configured to acquire a transmission ending moment of a wireless frame when selecting to refuse or drop the wireless frame and not updating a local Network Allocation Vector (NAV) which is stored locally, and to access the channel when transmission of the wireless frame is ended and a preset condition is met;

wherein the wireless STA is configured to determine that the preset condition is met after a preset waiting time is started after the transmission of the wireless frame is ended, and after the preset waiting time is up, wherein the preset waiting time is an Extended Inter-Frame Space (EIFS) or an Extended Inter-Frame Space−Distributed Inter-Frame Space+Arbitration Inter-Frame Space[Access Category] (EIFS−DIFS+AIFS[AC]); and DIFS=aSIFSTime+2*aSlotTime; EIFS=aSIFSTime+DIFS+ACKTxTime; AIFS[AC]=AIFSN[AC]*aSlotTime+aSIFSTime, aSIFSTime is a time length of a Short Inter-Frame Space (SIFS), aSlotTime is a time length of a timeslot, and AIFS[AC] is an Inter-Frame Space (IFS) corresponding to each priority queue AC; AIFSN[AC] is an integer corresponding to each priority queue AC; and ACKTxTime is a transmission time of an ACK frame.

7. The system according to claim 6, wherein the wireless STA is further configured to select to refuse or drop the wireless frame when determining that the wireless STA is not a target receiving STA of the wireless frame by detecting a physical frame header of the wireless frame.

8. The system according to claim 6, wherein the wireless STA is configured to acquire the transmission ending moment of the wireless frame by virtue of an L-SIG part of a physical frame header of the wireless frame.

9. The system according to claim 6, wherein the wireless STA is further configured to judge whether the local NAV is 0 or not; to access the channel when the local NAV is 0; to wait to access the channel until the local NAV becomes 0, when the local NAV is not 0.

10. The system according to claim 6, wherein the wireless STA is further configured to receive a frame sequence in which the local NAV is correctly set after the transmission of the wireless frame is ended; or correctly decode L-SIG information of a physical frame header of the wireless frame after the transmission of the wireless frame is ended; or wait for a preset dot11VHTProbeDelay time after the transmission of the wireless STA is ended.

* * * * *